United States Patent
Ono (10) Patent No.: US 9,110,625 B2
(45) Date of Patent: Aug. 18, 2015

(54) PORTABLE TERMINAL AND DISPLAY METHOD

(75) Inventor: Koji Ono, Osaka (JP)

(73) Assignee: KYOCERA Corporation, Kyoto (JP)

( * ) Notice: Subject to any disclaimer, the term of this patent is extended or adjusted under 35 U.S.C. 154(b) by 28 days.

(21) Appl. No.: 13/984,151

(22) PCT Filed: Feb. 7, 2012

(86) PCT No.: PCT/JP2012/000806
§ 371 (c)(1),
(2), (4) Date: Aug. 7, 2013

(87) PCT Pub. No.: WO2012/108183
PCT Pub. Date: Aug. 16, 2012

(65) Prior Publication Data
US 2013/0321244 A1    Dec. 5, 2013

(30) Foreign Application Priority Data
Feb. 7, 2011    (JP) ................. 2011-023598

(51) Int. Cl.
*G09G 3/14*    (2006.01)
*G06F 3/14*    (2006.01)
*G09F 9/30*    (2006.01)

(52) U.S. Cl.
CPC ............ *G06F 3/1446* (2013.01); *G06F 3/1431* (2013.01); *G09F 9/301* (2013.01); *G09G 2300/026* (2013.01); *G09G 2340/0464* (2013.01); *G09G 2340/0492* (2013.01); *G09G 2380/14* (2013.01)

(58) Field of Classification Search
None
See application file for complete search history.

(56) References Cited

U.S. PATENT DOCUMENTS

| 5,900,848 A | 5/1999 | Haneda et al. |
| 2008/0129666 A1 | 6/2008 | Shimotono et al. |
| 2010/0085274 A1* | 4/2010 | Kilpatrick et al. |

FOREIGN PATENT DOCUMENTS

| JP | H09-305262 A | 11/1997 |
| JP | 2002-258806 A | 9/2002 |
| JP | 2005-037747 A | 2/2005 |
| JP | 2008-139711 A | 6/2008 |

(Continued)

OTHER PUBLICATIONS

International Search Report dated May 15, 2012, issued for International Application No. PCT/JP2012/000806.

(Continued)

*Primary Examiner* — Joseph Haley
(74) *Attorney, Agent, or Firm* — Procopio, Cory, Hargreaves & Savitch LLP (57) ABSTRACT

A portable terminal has a first display and a second display, and is transformable between a first form and a second form. The first form is formed by arranging the first display and the second display to form a combined display, and the second form is formed by overlaying the second display upon the first display. In the first form displaying is performed on the combined display and in the second form displaying is performed on only the second display. The portable terminal detects a tilt of the portable terminal at a primary surface of the second display. When the portable terminal is in the first form, the tilt that is detected is corrected and displaying is performed based on the corrected tilt. When the portable terminal is in the second form, displaying is performed based on the detected tilt.

7 Claims, 10 Drawing Sheets

(56) References Cited

FOREIGN PATENT DOCUMENTS

| | | | |
|---|---|---|---|
| JP | 2012-508406 | A | 4/2012 |
| WO | 2010/028407 | A1 | 3/2010 |

OTHER PUBLICATIONS

Office Action dated Mar. 3, 2015 issued in counterpart Japanese application No. JP2011-023598.

* cited by examiner

Standard position

FIG. 5B

Rotated 90 degrees anti-clockwise from standard position

Standard position

FIG. 9B

Rotated 90 degrees anti-clockwise from standard position

FIG. 10A

Rotated 90 degrees anti-clockwise from standard position

FIG. 10B

Standard position

PORTABLE TERMINAL AND DISPLAY METHOD

TECHNICAL FIELD

The present invention relates to portable terminals, and in particular to a portable terminal that is provided with two displays and that is transformable between a form where displaying is performed using one of the two displays and a form where displaying is performed by using the two displays as one display.

BACKGROUND ART

It is conventionally known that, by putting two displays in alignment and using the two displays as one display, it is possible to increase a size of a display of a portable terminal (Patent Literature 1).

As a method of displaying an image, etc., there exists conventional technology that changes an orientation of an image to be displayed according to an orientation of a display, i.e. whether a long side of the display is vertical or horizontal. According to this technology, by detecting whether the long side or a short side of the display is vertical or horizontal, the orientation of the display can be known, and according to the orientation of the display, it is possible to switch between a portrait display mode where a long side of an image to be displayed is orientated vertically and a landscape display mode where a long side of an image to be displayed is orientated horizontally.

CITATION LIST

Patent Literature

[Patent Literature 1]
Japanese Patent Application Publication No. 2002-258806

SUMMARY OF INVENTION

Technical Problem

In recent years, miniaturization of portable terminals has advanced, and consequently there is also a growing need to miniaturize portable terminals including two displays that can be put in alignment and used as a single display (hereafter, a "combined display"). As one idea for miniaturization, such a portable terminal may be composed of a first casing that has a first display and a second casing that has a second display, and be configured such that the portable terminal is transformable between two forms: a first form where displaying is performed by putting the first display and the second display in alignment; and a second form where displaying is performed using only the second display. With a portable terminal configured in such a way, the relationship between the vertical/horizontal directions of the second display may be the inverse of the relationship between the vertical/horizontal directions of the combined display, depending on the arrangement of the first display and the second display. For example, when forming the combined display by positioning a long side of the first display next to a long side of the second display, one long side of the first display and one long side of the second display become short sides of the combined display, and a combination of one short side of the first display and one short side of the second display become a long side of the combined display.

When performing displaying using only the second display, switching between a portrait display mode and a landscape display mode is possible by detecting whether the long side of the second display is vertical or horizontal. However, when the relationship between the vertical/horizontal directions of the second display is inverted as with the combined display described above, a result of detecting whether the long side of the second display is vertical or horizontal is not useful by itself.

Therefore, with regard to a portable terminal that has two displays and is capable of using both displays in combination as one large display and of using only one display, a portable terminal and a display method are desired that can specify an orientation of the large display according to a detected orientation of one of the two displays.

Solution to Problem

In order to achieve the above object, the present invention provides a portable terminal including a casing that includes a first display and a casing that includes a second display, comprising: a first detecting module configured to detect a form of the portable terminal, the form being the first form formed by the first display and the second display arranged so that a short side of the first display and a short side of the second display combine to form a long side of a combined display, or the second form formed by overlaying the casing that includes the second display upon the casing that includes the first display, in the first form displaying being performed on the combined display and in the second form displaying being performed on only the second display; a second detecting module configured to detect a tilt of one side of the second display; a correction module configured to, when the first form is detected by the first detecting module, correct a result of the detection by the second detecting module; and a display processing module configured to, (i) when the first form is detected, display an image on the combined display using a first display form that is in accordance with a tilt indicated by a result of the correction by the correction module, in the first display form images being displayed according to an orientation of a long side and a short of the combined display, and (ii) when the second form is detected, display an image on the second display using a second display form that is in accordance with the tilt indicated by the result of the detection by the second detecting module, in the second display form images being displayed according to an orientation of a long side and a short side of the second display.

Advantageous Effects of Invention

With regard to a portable terminal that has two displays and is capable of using both displays in combination as one large display and of using only one display, the portable terminal pertaining to one aspect of the present invention can specify an orientation of the large display according to a detected orientation of one side of one of the two displays.

DESCRIPTION OF EMBODIMENT

1. Embodiment 1.1 Outline

The following describes a portable telephone 100 that is transformable between a first form and a second form as an embodiment of a portable communication terminal that pertains to the present invention.

Figure 1A:
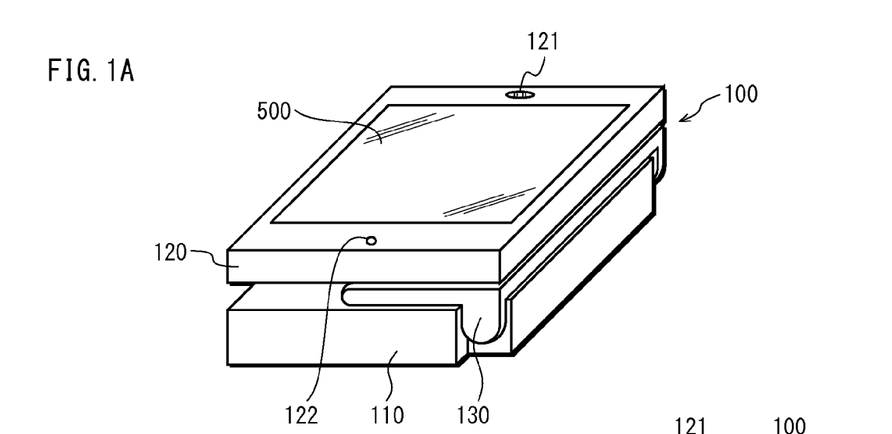
FIG. 1A illustrates a perspective view of a portable telephone 100 when in a second form.
Figure 1B:
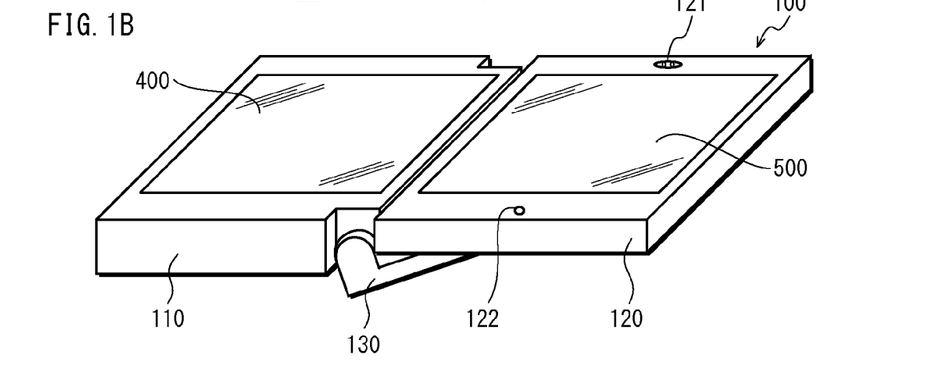
FIG. 1B illustrates a perspective view of the portable telephone 100 when in a first form.
Figure 1C:
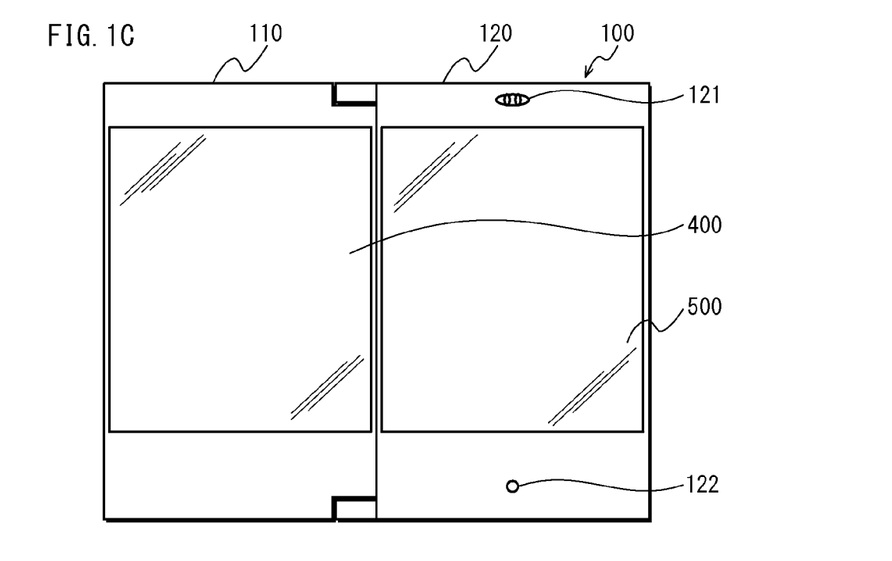
FIG. 1C illustrates a plan view of the portable telephone 100 when in the first form.

FIG. 1A illustrates a perspective view of the portable telephone 100 when in the second form. FIG. 1B and FIG. 1C illustrate a perspective view and a plan view, respectively, of the portable telephone 100 when in the first form.

As illustrated in FIG. 1A and FIG. 1B, the portable telephone 100 has a first casing 110, a second casing 120, and an arm 130 that connects the first casing 110 and the second casing 120.

A base end of the arm 130 is attached to the first casing 110 so as to be rotatable. A tip end of the arm 130 supports the second casing 120 so as to be slidable and rotatable. Therefore, the first casing 110 and the second casing 120 are not limited to rotating relative to each other, and the portable telephone 100 is transformable between the second form illustrated in FIG. 1A and the first form illustrated in FIG. 1B.

The first form, as illustrated in FIG. 1B, is a form where one side surface of the first casing 110 (a side surface including a long side of the first casing 110) and one side surface of the second casing 120 (a side surface including a long side of the second casing 120) are in contact with each other such that a primary surface of the first casing 110 and a primary surface of the second casing 120 form a single level surface. The second form, as illustrated in FIG. 1A, is a form wherein the first casing 110 and the second casing 120 overlap each other, i.e. the primary surface of the first casing 110 and a rear surface of the second casing 120 are in contact with each other.

The first casing 110 has a first display 400 and the second casing 120 has a second display 500. As illustrated in FIG. 1C, when the portable telephone 100 is in the first form, a display surface of the first display 400 and a display surface of the second display 500 are adjacent to each other on the same level plane. As such, when in the first form, a combination of the display surface of the first display 400 and the display surface of the second display 500 is usable as a single large display surface. When in the second form, displaying of images etc. is performed by using only the display surface of the second display 500. Hereafter, a large display that is formed by combining the first display and the second display is referred to as a "combined display".

Further, if each short side of the first display 400 and the second display 500 is considered to have a length of 1 and each long side of the first display 400 and the second display 500 is considered to have a length of x, x is considered to be greater than 1 and less than 2. This means that the relationship between the vertical and horizontal lengths of the display surface of the second display 500 is the inverse of the relationship between the vertical and horizontal lengths of the display surface of the combined display. This is because, according to the length of a long side and a short side mentioned above, the length of each side that forms a display surface of the combined display is either the length of a long side of one of the first display 400 and the second display 500 or is a sum of the length of a short side of the first display 400 and the length of a short side of the second display 500 (hereafter, a "combined side"). According to the above-described relationship between the length of the long and short sides of the combined display, if a short side of one of the first display 400 and the second display 500 is considered to have a length of 1, the combined side has a length of 2 and is therefore longer than a long side of one of the first display 400 and the second display 500 with length x (x being greater than 1 and less than 2).

Figure 2:
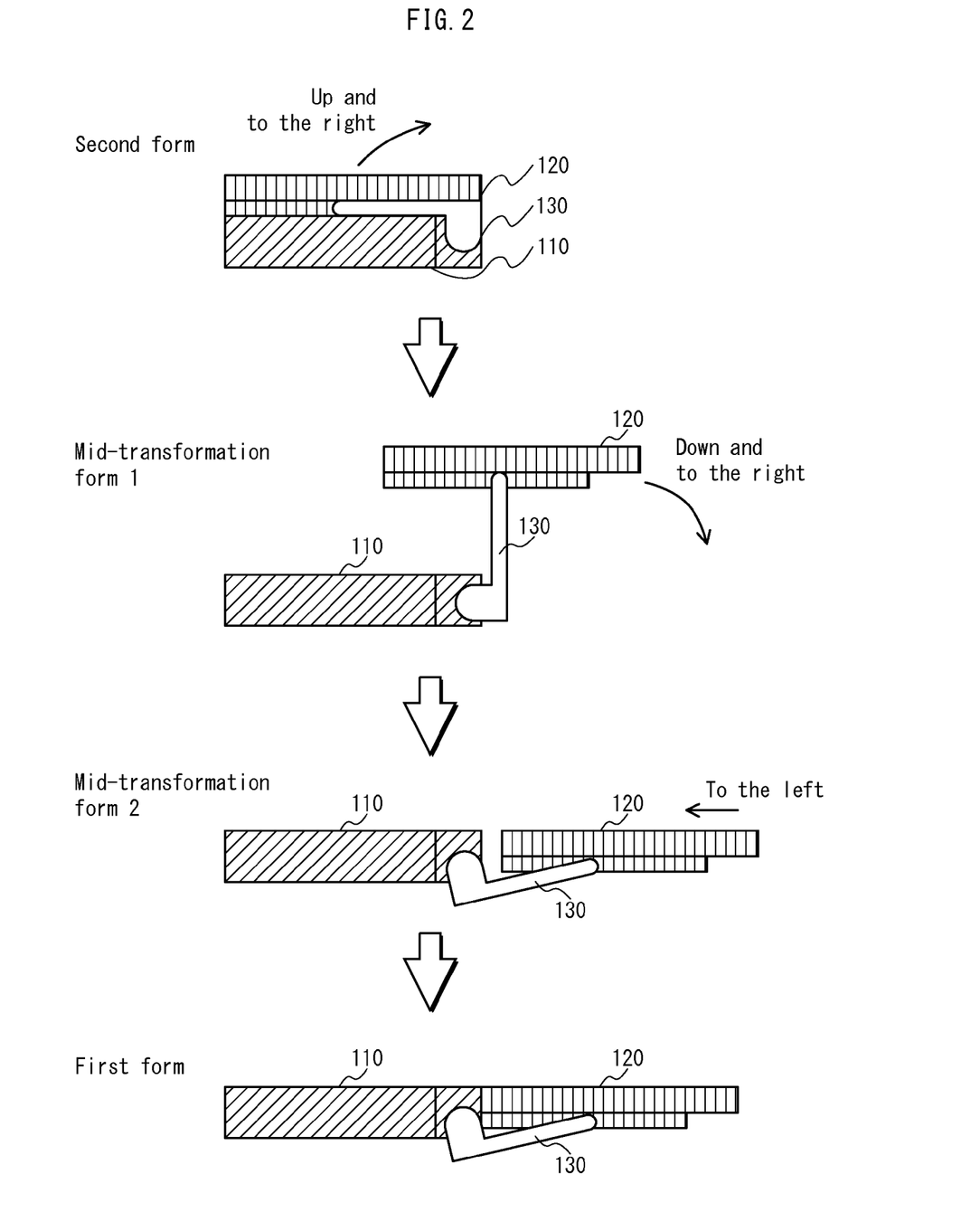
FIG. 2 illustrates a side view of a transformation operation of the portable telephone 100.

Using FIG. 2, the following is a step-by-step description of transitional forms of the portable telephone 100 when a user of the portable telephone 100 changes the form of the portable telephone 100.

As illustrated in FIG. 2, when a user transforms the portable telephone 100 from the second form to the first form, first, the second casing is rotated clockwise around an axis centered at the point where the base end of the arm 130 is attached to the first casing 110. This rotation is achieved without changing an orientation of the primary surface of the second casing 120 (refer to mid-transformation form 1 in FIG. 2).

The user continues rotating the second casing 120 until the primary surface of the second casing 120 is on a same level plane as the primary surface of the first casing 110 (refer to mid-transformation form 2 in FIG. 2).

Finally, when the primary surface of the first casing 110 and the primary surface of the second casing 120 are on the same level plane, the user slides the second casing 120 in the direction of the first casing 110 (refer to mid-transformation form 2 in FIG. 2) and the portable telephone 100 is thereby transformed to the first form.

The following describes functional elements of the portable telephone 100 with reference to the drawings. Note that in the following description, a long side of the portable telephone 100 refers to a vertical side and a short side of the portable telephone 100 refers to a horizontal side.

1.2 Configuration

The following describes a configuration of a display function of the portable telephone 100 for displaying images etc.

Figure 3:
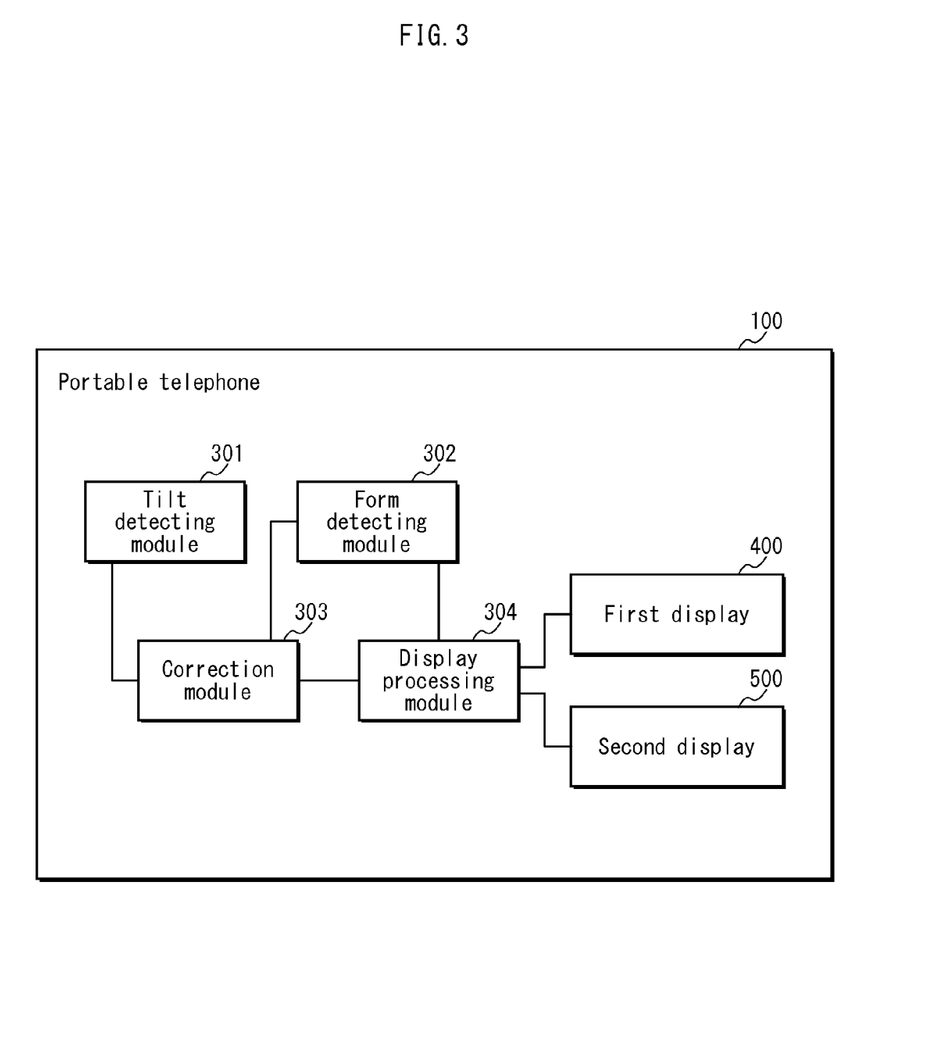
FIG. 3 is a block diagram illustrating a configuration of the portable telephone 100.

As shown in FIG. 3, the display function of the portable telephone 100 includes a tilt detecting module 301, a form detecting module 302, a correction module 303, a display processing module 304, the first display 400, and the second display 500.

FIG. 3 shows only constituent elements of the portable telephone 100 pertaining to the display function, but as shown in FIG. 1C, the portable telephone 100 also includes a speaker 121 and a microphone 122, and other elements pertaining to communication functions, key press operations, etc. that are typical to a portable telephone.

(1) Tilt Detecting Module 301

The tilt detecting module 301 is, for example, an acceleration sensor. The tilt detecting module 301 detects a force of gravity exerted on the portable telephone 100 and specifies an orientation of vertical and horizontal sides of the portable telephone 100 based on gravitational acceleration detected.

Figure 4A:
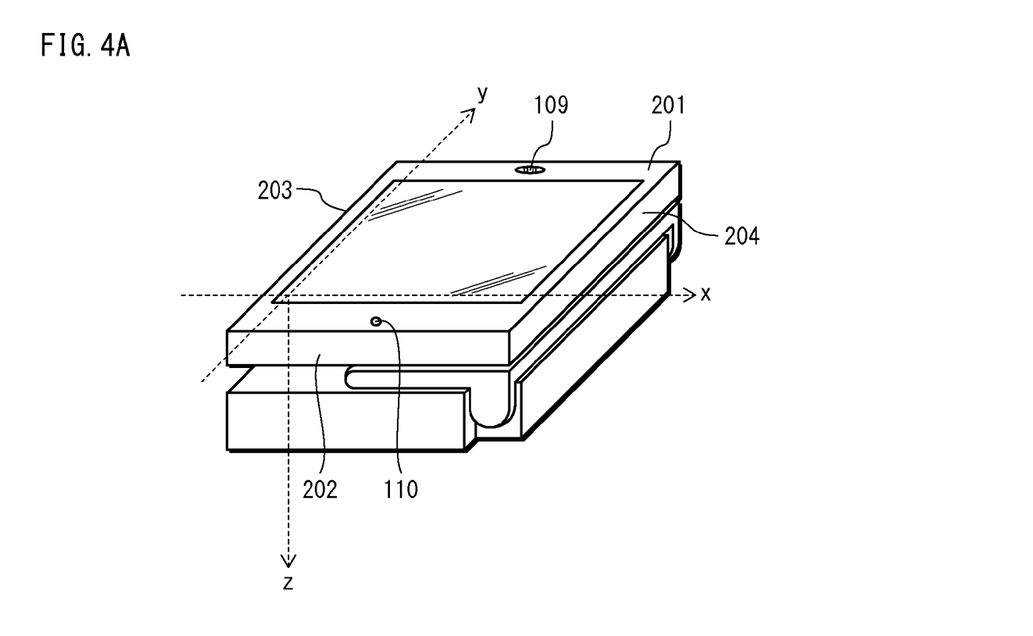
FIGS. 4A and 4B are diagrams for an explanation of a tilt detecting module 301.

When the speaker 121 is considered a top end 201 and the microphone 122 is considered a bottom end 202, an x axis, a y axis and a z axis can be defined as illustrated in FIG. 4A. Note that a position of the portable telephone 100 in which the speaker 121 is considered the top end 201 and the microphone 122 is considered the bottom end 202 is herein called a standard position.

When the portable telephone 100 is rotated about the x axis, the rotation generates a y component, and when the portable telephone 100 is rotated about the y axis, the rotation generates an x component. Furthermore, when the portable telephone 100 is rotated about the z axis, the rotation generates both an x component and a y component. The tilt detecting module 301 detects a direction of a two-dimensional vector indicated by the x component and the y component. In other words, the tilt detecting module 301 calculates an angle θ, indicated by the x component and the y component. A range of the angle thus calculated (detected) is within a range of 0 to 90 degrees. Further, when the portable telephone 100 is in the second form, the orientation of the two-dimensional vector that is derived from the x component and the y component coincides with the orientation of one short side of the second casing 120. In other words, the orientation of the two-dimensional vector coincides with the orientation of one short side of the second display 500.

Figure 4B:
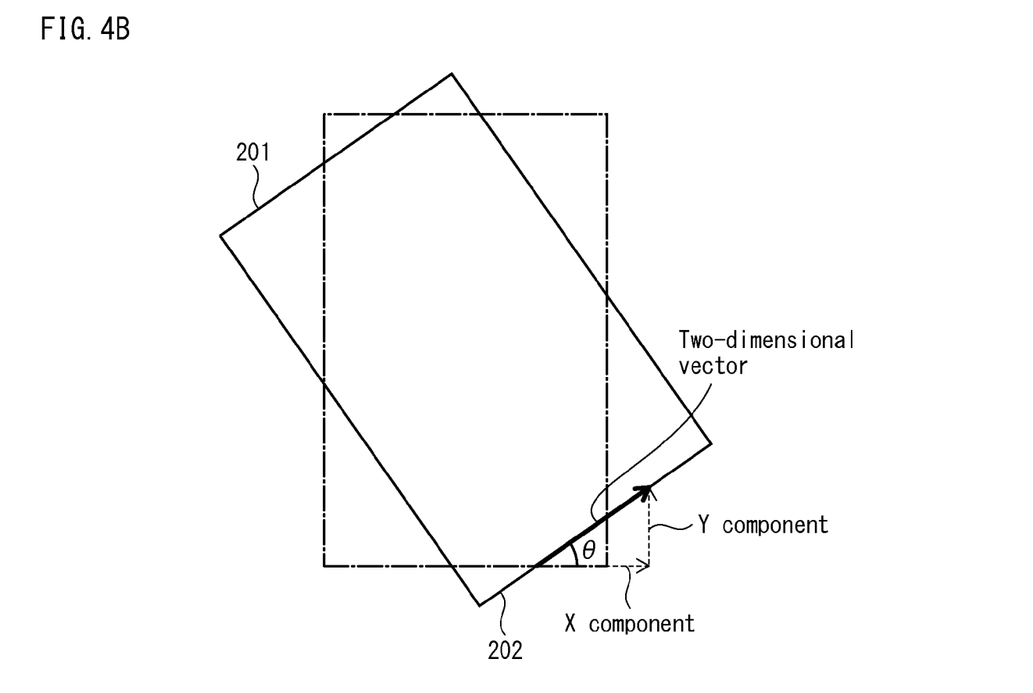

For instance, FIG. 4B illustrates a situation where the portable telephone 100 is rotated about the z axis. In this situation, the tilt detecting module 301 calculates a value of θ that satisfies tan θ=y component/x component, by using the x component and y component generated as a result of the rotation.

For example, when only the y component is generated, θ is calculated as 90 degrees and when only the x component is generated, θ is calculated as 0 degrees.

(2) Form Detecting Module 302

The form detecting module 302 detects whether the form of the portable telephone 100 is the first form or the second form.

Specifically, the form detecting module 302 has a first sensor and a second sensor. The first sensor detects a contact between a side of the first casing 110 and a side of the second casing 120 that come into contact when the primary surface of the first casing 110 and the primary surface of the second casing 120 form a single level surface. The second sensor detects a contact between the primary surface of the first casing 110 and the rear surface of the second casing 120.

When the first sensor is detecting contact, the form detecting module 302 specifies that the portable telephone 100 is in the first form, and when the second sensor is detecting contact, the form detecting module 302 specifies that the portable telephone 100 is in the second form. When both sensors are not detecting contact, the form detecting module 302 specifies that the portable telephone 100 is undergoing transformation between the first and second forms.

(3) Correction Module 303

When the portable telephone 100 is in the first form, the correction module 303 performs a correction of the result of the detection by the tilt detecting module 301. Specifically, the correction module 303 adds 90 degrees to the angle θ that is calculated by the tilt detecting module 301. According to this correction, the direction of the two-dimensional vector is corrected.

When the portable telephone 100 is in the second form, the two-dimensional vector that is derived from the x component and the y component coincides with the orientation of a short side of the second display. However, when the portable telephone 100 is in the first form and if the correction were not to take place, the two-dimensional vector that is derived from the x component and the y component would coincide with the orientation of a short side of the second display, i.e. the orientation of a combined side of the combined display. In other words, from among the sides of the display surface of the combined display, the two-dimensional vector would coincide with a long side. This would mean that between the first form and the second form, the orientation of the side with which the two-dimensional vector coincides would be inverted. However, by using the correction, the orientation of the side with which the two-dimensional vector coincides can be corrected. Furthermore, an angle that results from the correction is within a range of 90 to 180 degrees. In other words, when including situations where the correction does not take place, the correction module 303 handles an angle that is within a range of 0 to 180 degrees.

(4) Display Processing Module 304

The display processing module 304 specifies a display form of an image to be displayed, according to the form and the orientation of the portable telephone 100. The display processing module 304 also executes controls such that the image is displayed on an appropriate display in the display form specified.

The display processing module 304 has a buffer that temporarily stores an image to be displayed. The display processing module 304 is configured with addresses that indicate storage locations in the buffer, and are associated with coordinates that indicate positions of pixels of the first display 400 and the second display 500.

Figure 5A:
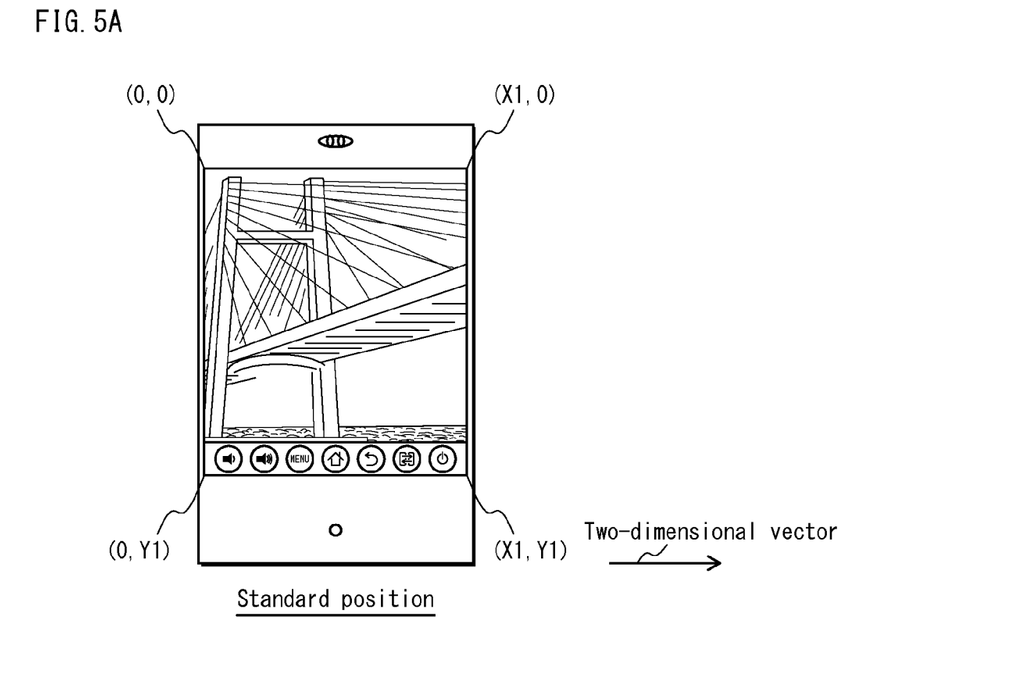
FIGS. 5A and 5B illustrate a coordinate system set with respect to pixels of a second display 500 when the portable telephone 100 is in the second form.

As illustrated in FIG. 5A, when the portable telephone 100 is in the second form and in the standard position, the display processing module 304 stores an image to be displayed in the buffer by setting a coordinate (0,0) as a start point of the image and a coordinate (X1,Y1) as an end position of the image. The coordinate (0,0) indicates a position of a first pixel of the second display 500. The display processing module 304 thereafter displays the image on the display surface of the second display 500. This display form is called a "portrait display mode in the second form". In this situation the angle θ is derived from an x and a y component from the tilt detecting module 301, and the correction is not performed. In other words, the two-dimensional vector that is derived from the x component and the y component is orientated in the same direction as one short side of the second display 500.

Figure 5B:
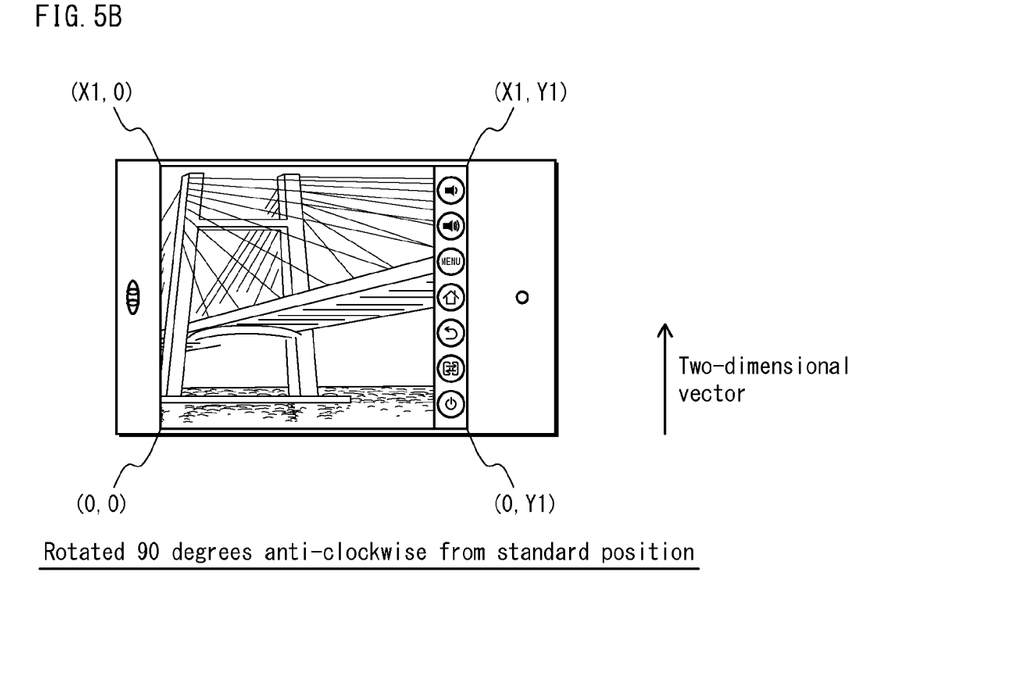

As illustrated in FIG. 5B, when the portable telephone 100 is in the second form and is rotated counterclockwise 90 degrees from the standard position, the display processing module 304 stores an image to be displayed in the buffer by setting a coordinate (X1,0) as a start point of the image and a coordinate (0,Y1) as an end position of the image. The coordinate (X1,0) indicates a position of a first pixel of the second display 500. The display processing module 304 thereafter displays the image on the display surface of the second display 500. This display form is called a "landscape display mode in the second form". In this situation, as in the situation described above, the angle θ is derived from an x and a y component from the tilt detecting module 301, and the correction is not performed. In other words, the two-dimensional vector that is derived from the x component and the y component is orientated in the same direction as one short side of the second display 500.

Here, assume that the image to be displayed is in a vector format and information output from an external factor that performed an instruction to display the image indicates that the image is to be displayed by the portable terminal 100 in the second form in the standard position. In this situation, when carrying out a portrait display in the second form, the portable telephone 100 carries out display processing using vectors indicated by the information received, without making any changes thereto. When carrying out a landscape display, the image processing module 304 rotates by 90 degrees the vectors indicated by the information received, and then carries out displaying.

Figure 6A:
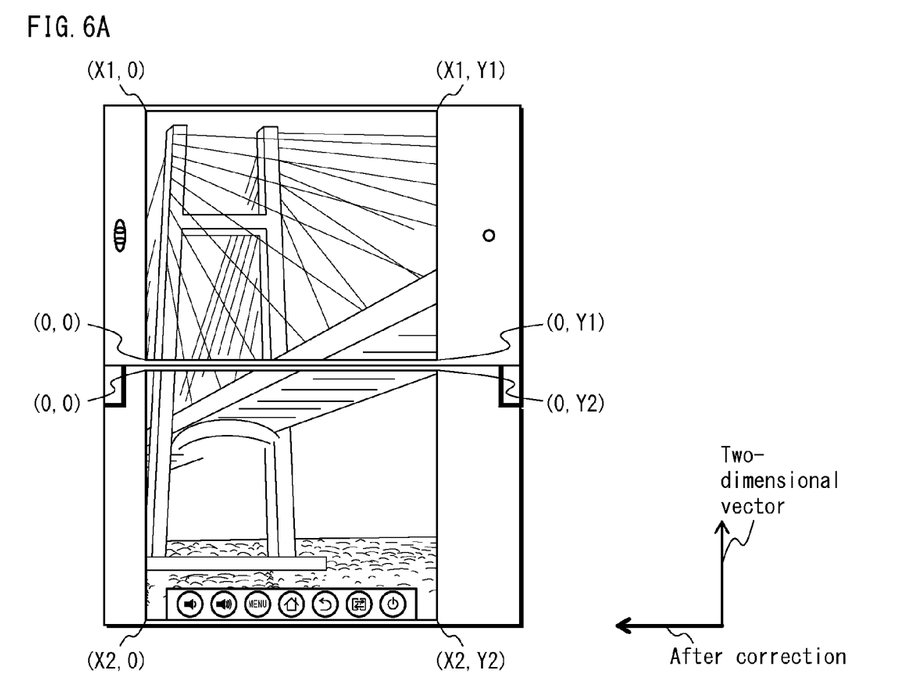
FIGS. 6A and 6B illustrate a coordinate system set with respect to pixels of a combined display when the portable telephone 100 is in the first form.

As illustrated in FIG. 6A, when the portable telephone 100 is in the first form and is rotated counterclockwise 90 degrees from the standard position, the display processing module 304 stores an image to be displayed in the buffer by setting a coordinate (X1,0) as a start point of the image and a coordinate (X2,Y2) as an end position of the image. The coordinate (X1,0) indicates a position of a first pixel of the second display 500 and the coordinate (X2,Y2) indicates a position of the first display 400. The display processing module 304 thereafter displays the image on a combination of display surfaces of the first display 400 and the second display 500. This display form is called a "portrait display mode in the first form". In this situation, 90 degrees is added to the angle θ, which is derived from an x component and a y component from the tilt detecting module 301. In other words, a two-dimensional vector after correction is not orientated in the same direction as one short side of the second display, but is orientated in the same direction as one short side of the combined display.

Figure 6B:
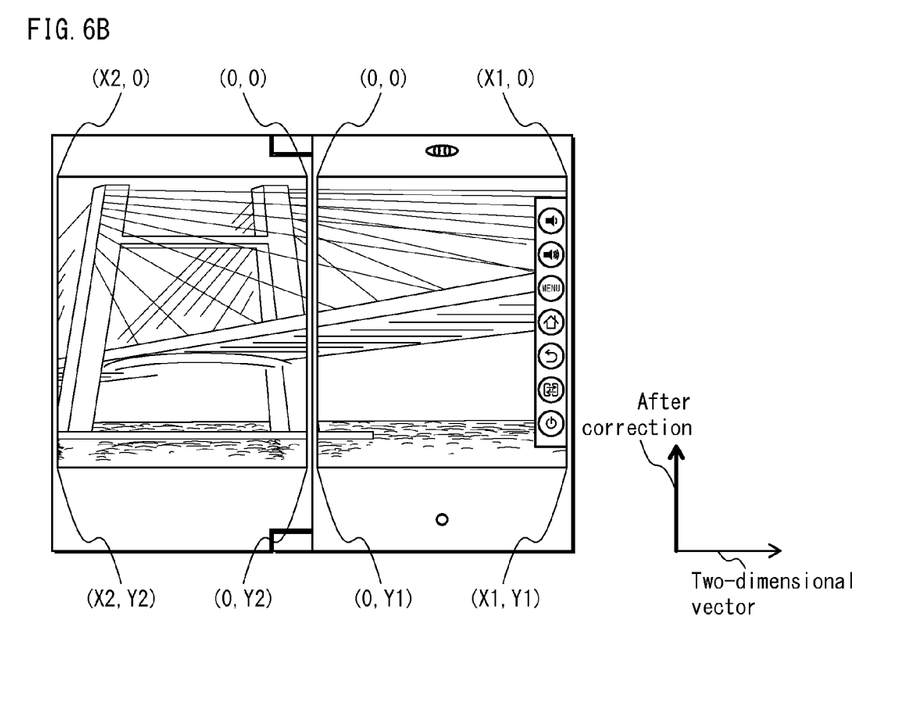

As illustrated in FIG. 6B, when the portable telephone 100 is in the first form and in the standard position, the display processing module 304 stores an image to be displayed in the buffer by setting a coordinate (X2,0) as a start point of the image and a coordinate (X1,Y1) as an end position of the image. The coordinate (X2,0) indicates a position of the first display 400 and the coordinate (X1,Y1) indicates a position of the second display 500. The display processing module 304 thereafter displays the image on a combination of display surfaces of the first display 400 and the second display 500. This display form is called a "landscape display mode in the first form". In this situation, 90 degrees is added to an angle θ, which is derived from an x component and a y component from the tilt detecting module 301. In other words, a two-dimensional vector after the correction is performed is not orientated in the same direction as one short side of the second display, but is orientated in the same direction as one short side of the combined display.

Here, assume that the image to be displayed is in a vector format and information output from an external factor that performed an instruction to display the image indicates that the image is to be displayed by the portable terminal 100 in the second form in the standard position. In this situation, when carrying out a portrait display in the first form, the portable telephone 100 carries out display processing using vectors indicated by the information received, without making any changes thereto. When carrying out a landscape display, the image processing module 304 rotates by 90 degrees the vectors indicated by the information received, and then carries out displaying. Note that since an area on which the image is to be displayed in the first form is larger than an area on which the image is to be displayed in the second form, the image to be displayed may be enlarged.

(5) First Display 400

When the portable telephone 100 is in the first form, the first display 400 displays part of an image whose display form has been controlled by the display processing module 304, according to the orientation of the portable telephone 100. Note that the remainder of the image is displayed on the second display 500.

(6) Second Display 500

When the portable telephone 100 is in the first form, the second display 500 displays part of an image whose display form has been controlled by the display processing module 304, according to the orientation of the portable telephone 100. Note that the remainder of the image is displayed on the first display 400.

Further, when the portable telephone 100 is in the second form, the second display 500 displays an image whose display form has been controlled by the display processing module 304, according to the orientation of the portable telephone 100.

1.3 Operations

The following describes operations involved in the displaying of images etc. in the portable telephone 100.

(1) Correction Processing

Figure 7:
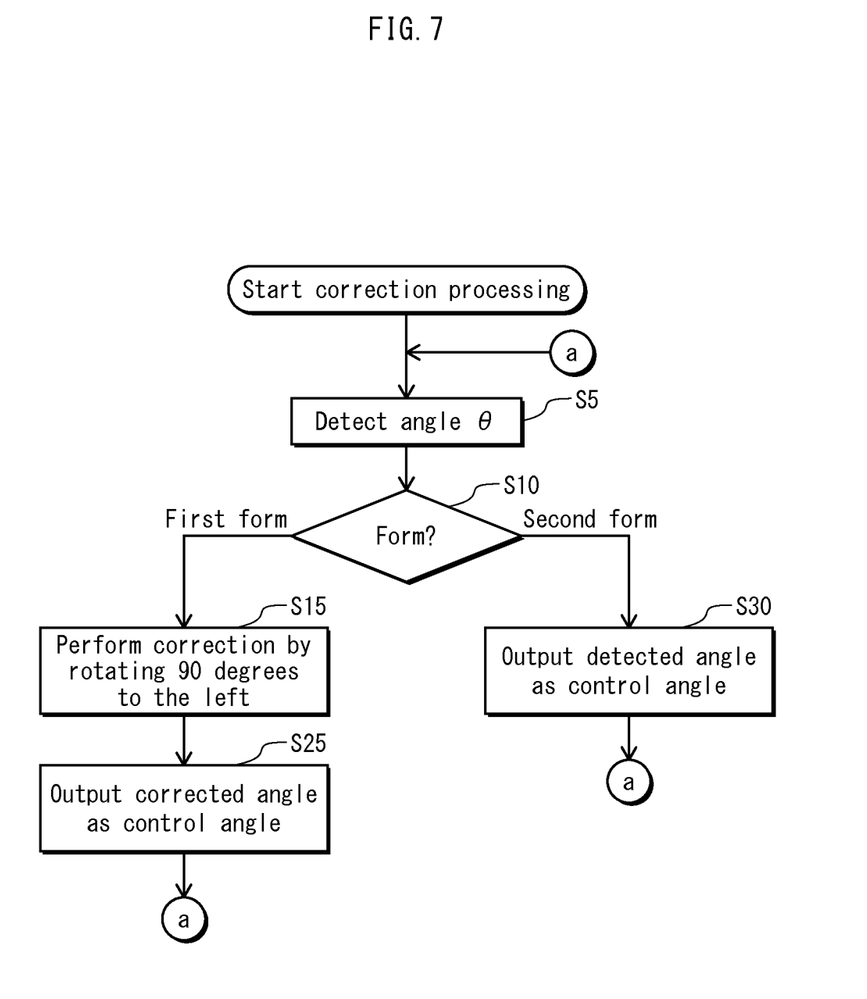
FIG. 7 is a flowchart illustrating operations of correction processing.

Using the flowchart illustrated in FIG. 7, the following describes correction processing with regard to the angle θ, which is detected by the tilt detecting module 301.

The tilt detecting module 301 detects (calculates) the angle θ with regard to the portable telephone 100 (Step S5).

The form detecting module 302 detects if the portable telephone 100 is in the first form or in the second form (Step S10).

When the form detecting module 302 detects that the portable telephone 100 is in the first form (Step S10: "First form"), the correction module 303 adds 90 degrees to the result detected in Step S5 (angle θ), i.e. performs correction with respect to the angle θ by rotating the direction of the two-dimensional vector counterclockwise 90 degrees (Step S15). Thereafter, the correction module 303 outputs the corrected angle as a control angle to the display processing module 304 (Step S25).

When the form detecting module 302 detects that the portable telephone 100 is in the second form (Step S10: "Second form"), the correction module 303 outputs the angle θ as a control angle to the display processing module 304 (Step S30).

(2) Display Switching Processing

Figure 8:
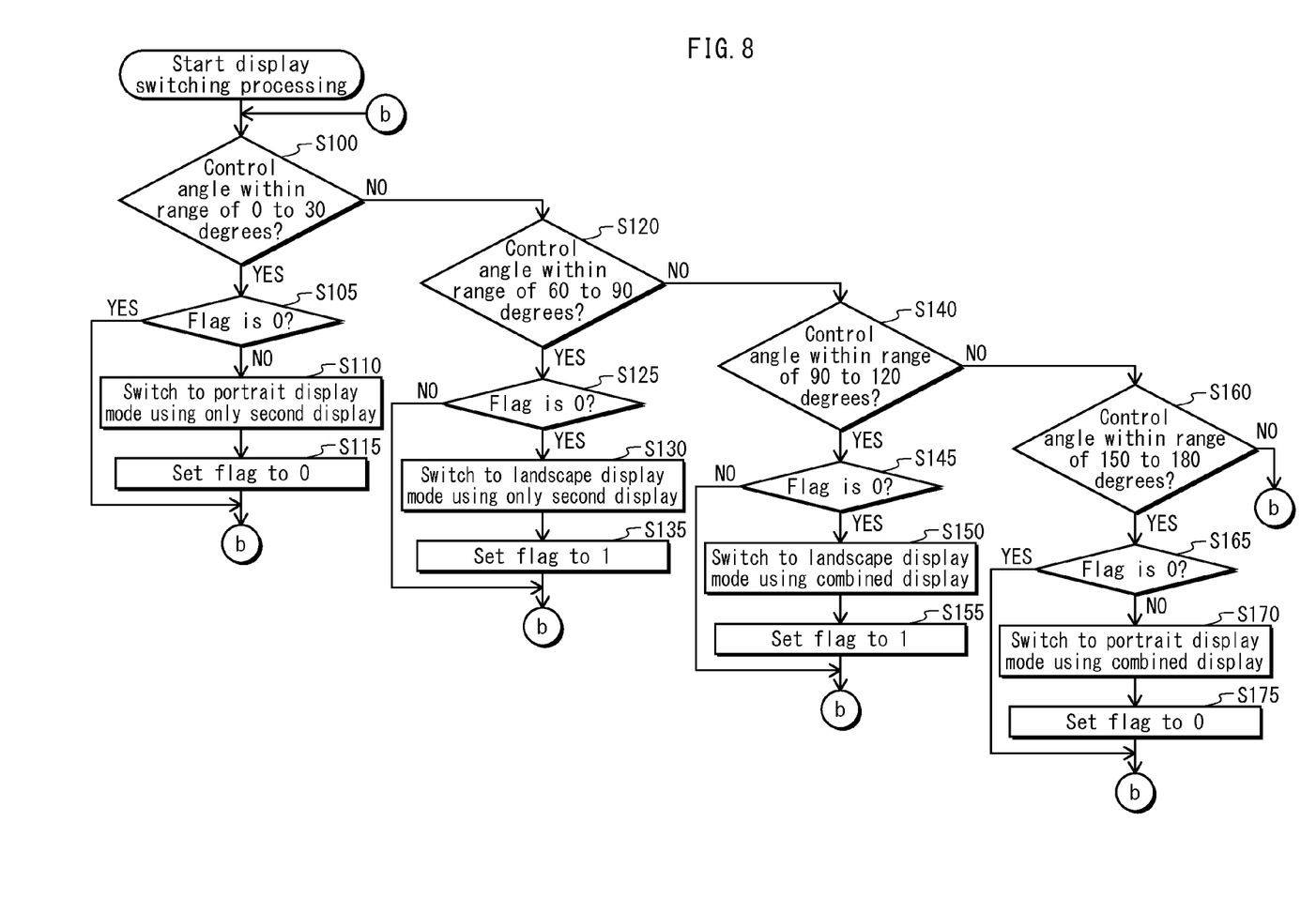
FIG. 8 is a flowchart illustrating operations of display switching processing.
Figure 9A:
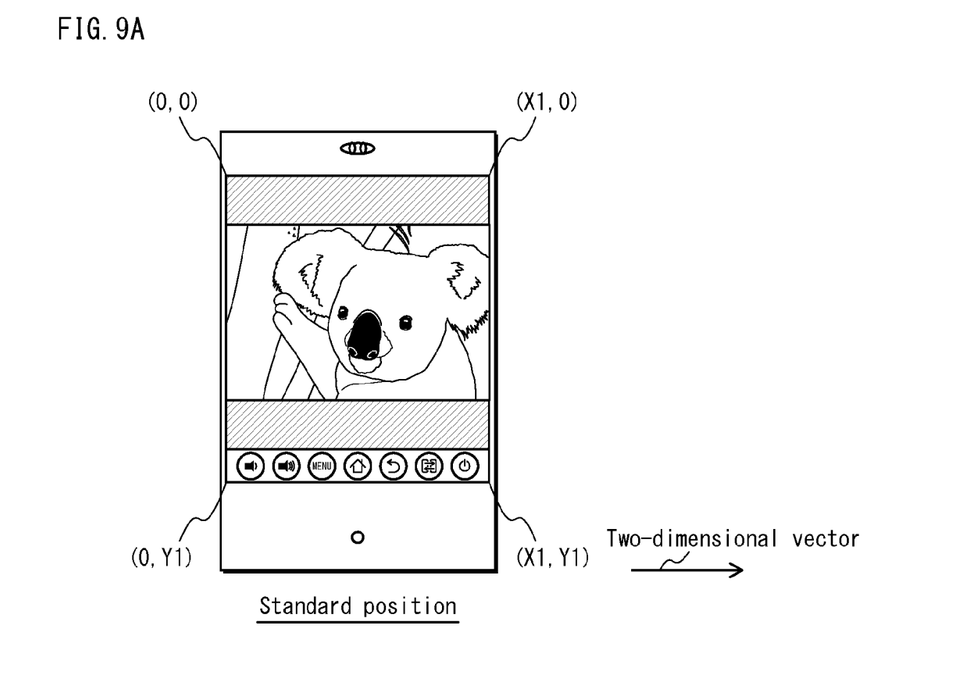
FIGS. 9A and 9B illustrate an example of not changing an aspect ratio of an image, when the portable telephone 100 is in the second form in a standard position and when the portable telephone 100 is in the second form and rotated 90 degrees.
Figure 9B:
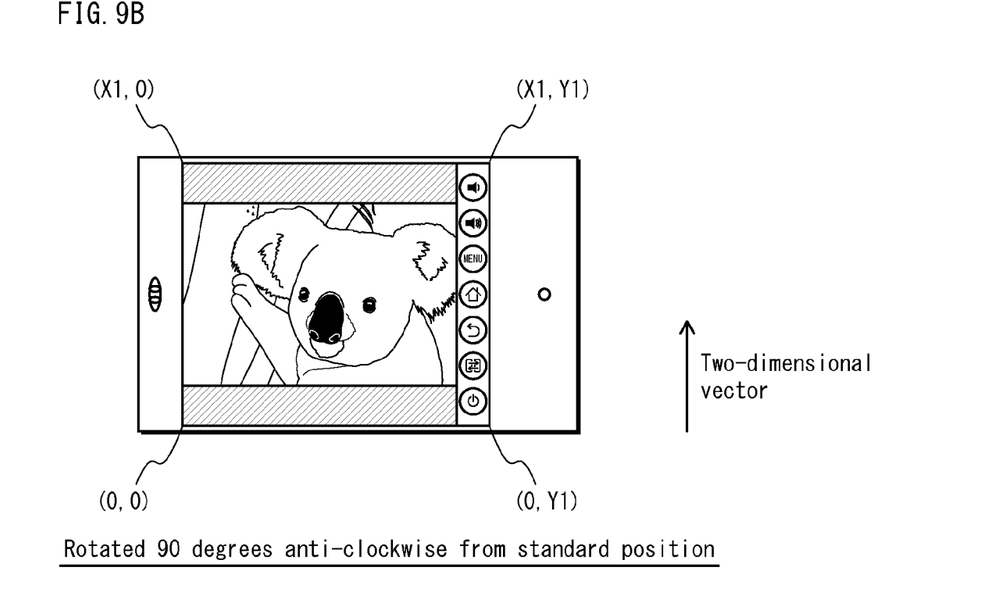
Figure 10A:
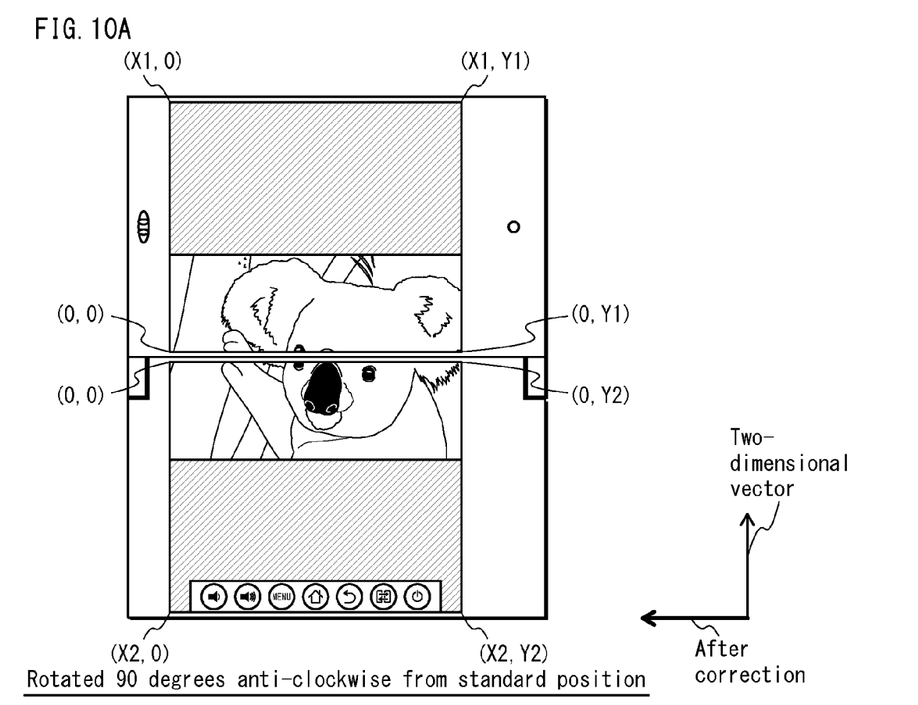
FIGS. 10A and 10B illustrate an example of not changing an aspect ratio of an image, when the portable telephone 100 is in the first form and rotated 90 degrees and when the portable telephone 100 is in the first form and in a standard position.
Figure 10B:
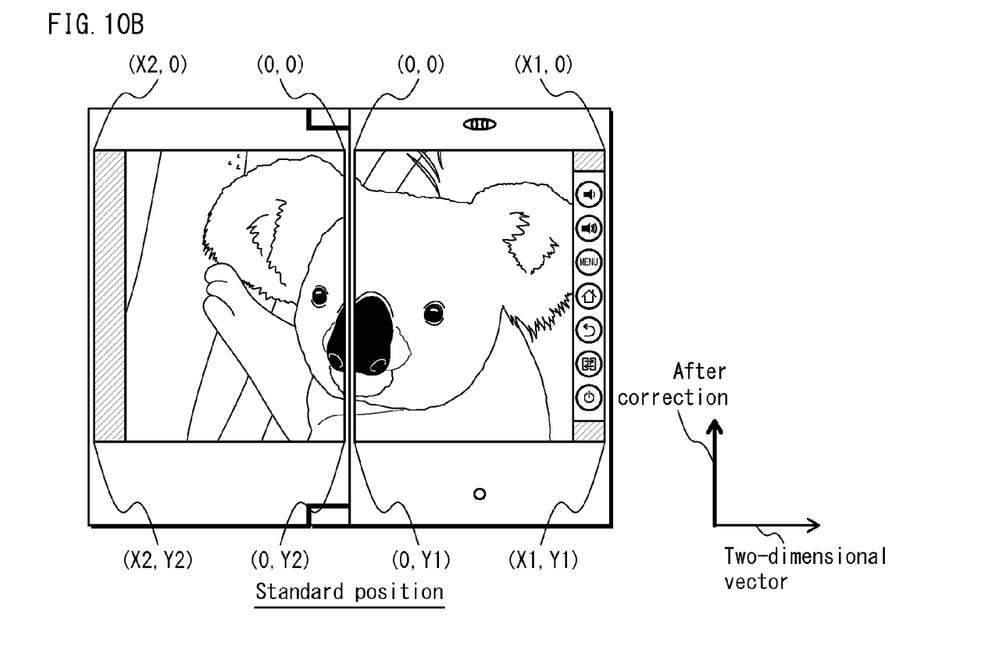

Using the flowchart illustrated in FIG. 8, the following describes display switching processing pertaining to switching of displaying of images, etc.

The display processing module 304 determines whether or not the control angle output from the correction module 303 is within a range of 0 to 30 degrees (Step S100).

When determining that the control angle is within a range of 0 to 30 degrees (Step S100: "Yes"), the display processing module 304 determines whether a current display mode is the landscape display mode or the portrait display mode (Step S105). Specifically, the display processing module 304 has a flag for distinguishing the current display mode. When a value indicated by the flag is "0", the current display mode is the portrait display mode, and when the value indicated by the flag is "1", the current display mode is the landscape display mode.

When determining that the value of the flag is not "0" at Step S105 (Step S105: "No"), the display processing module 304 switches to a display form causing an image to be displayed in the portrait display mode and by using only the second display 500 (Step S110). Thereafter, the display processing module 304 sets the value of the flag to "0" (Step S115) and processing returns to Step S100.

When determining that the value of the flag is "0" at Step S105 (Step S105: "Yes"), the processing of the display processing module 304 returns to Step S100.

When determining that the control angle is not within a range of 0 to 30 degrees (Step S100: "No"), the display processing module 304 determines whether or not the control angle is within a range of 60 to 90 degrees (Step S120).

When determining that the control angle is within a range of 60 to 90 degrees (Step S120: "Yes"), the display processing module 304 determines whether or not the value of the flag is "0" (Step S125).

When determining that the value of the flag is "0" at Step S125 (Step S125: "Yes"), the display processing module 304 switches to a display form causing an image to be displayed in the landscape display mode and by using only the second display 500 (Step S130). Thereafter, the display processing module 304 sets the value of the flag to "1" (Step S135) and processing returns to Step S100.

When determining that the value of the flag is not "0" at Step S125 (Step S125: "No"), the processing of the display processing module 304 returns to Step S100.

When determining that the control angle is not within a range of 60 to 90 degrees (Step S120: "No"), the display processing module 304 determines whether or not the control angle is within a range of 90 to 120 degrees (Step S140).

When determining that the control angle is within a range of 90 to 120 degrees (Step S140: "Yes"), the display processing module 304 determines whether or not the value of the flag is "0" (Step S145).

When determining that the value of the flag is "0" at Step S145 (Step S145: "Yes"), the display processing module 304 switches to a display form causing an image to be displayed in the landscape display mode and by using the combined display (Step S150). Thereafter, the display processing module 304 sets the value of the flag to "1" (Step S155) and processing returns to Step S100.

When determining that the value of the flag is not "0" at Step S145 (Step S145: "No"), the processing of the display processing module 304 returns to Step S100.

When determining that the control angle is not within a range of 90 to 120 degrees (Step S140: "No"), the display processing module 304 determines whether or not the control angle is within a range of 150 to 180 degrees (Step S160).

When determining that the control angle is within a range of 150 to 180 degrees (Step S160: "Yes"), the display processing module 304 determines whether or not the value of the flag is "0" (Step S165).

When determining that the value of the flag is not "0" at Step S165 (Step S165: "No"), the display processing module 304 switches to a display form causing an image to be displayed in the portrait display mode and by using the combined display (Step S170). Thereafter, the display processing module 304 sets the value of the flag to "0" (Step S175) and processing returns to Step S100.

When determining that the value of the flag is "0" at Step S165 (Step S165: "Yes"), the processing of the display processing module 304 returns to Step S100.

When determining that the control angle is not within a range of 150 to 180 degrees (Step S160: "No"), the processing of the display processing module 304 returns to Step S100.

1.4 Modifications

Explanation has been provided based on one embodiment of the present invention above, but the present invention is not limited in this way. For example, the following modifications are possible.

(1) In the above embodiment, when the correction is performed with respect to the angle θ, 90 degrees are added to the angle θ, but the present invention is not limited in this way.

When the correction is performed with respect to the angle θ, 90 degrees may be subtracted from the angle θ. When such a modification is made, the correction module 303 handles angles within a range of −90 to 90 degrees. In particular, when the portable terminal is in the first form, the correction module 303 handles angles within a range of −90 to 0 degrees.

(2) In the above embodiment, the angle θ detected by the tilt detecting module 301 is within a range of 0 to 90 degrees, but the present invention is not limited in this way. The angle θ may be within a range of 0 to 360 degrees or may be within a range of 0 to 180 degrees.

For example, the following describes a modification made such that the angle detected is within a range of 0 to 360 degrees.

First, explanation is provided of switching between display forms when the portable terminal is in the second form. When determining that the control angle is within a range of 90 to 120 degrees and the value of the flag is "0", the display processing module 304 switches to a display form causing an image to be displayed in the landscape display mode and by using only the second display 500. When determining that the control angle is within a range of 150 to 180 degrees and the value of the flag is "1", the display processing module 304 switches to a display form causing an image to be displayed in the portrait display mode and by using only the second display 500. When determining that the control angle is within a range of 180 to 210 degrees and the value of the flag is "1", the display processing module 304 switches to a display form causing an image to be displayed in the portrait display mode and by using only the second display 500. When determining that the control angle is within a range of 240 to 270 degrees and the value of the flag is "0", the display processing module 304 switches to a display form causing an image to be displayed in the landscape display mode and by using only the second display 500. When determining that the control angle is within a range of 270 to 300 degrees and the value of the flag is "1", the display processing module 304 switches to a display form causing an image to be displayed in the portrait display mode and by using only the second display 500. When determining that the control angle is within a range of 330 to 360 degrees and the value of the flag is "0", the display processing module 304 switches to a display form causing an image to be displayed in the landscape display mode and by using only the second display 500.

Next, explanation is provided of switching between display forms when the portable terminal is in the first form. When determining that the control angle is within a range of 180 to 210 degrees and the value of the flag is "1", the display processing module 304 switches to a display form causing an image to be displayed in the portrait display mode and by using the combined display. When determining that the control angle is within a range of 240 to 270 degrees and the value of the flag is "0", the display processing module 304 switches to a display form causing an image to be displayed in the landscape display mode and by using the combined display. When determining that the control angle is within a range of 270 to 300 degrees and the value of the flag is "0", the display processing module switches to a display form causing an image to be displayed in the landscape display mode and by using the combined display. When determining that the control angle is within a range of 330 to 360 degrees and the value of the flag is "1", the display processing module 304 switches to a display form causing an image to be displayed in the landscape display mode and by using the combined display. When determining that the control angle is within a range of 0 to 30 degrees and the value of the flag is "1", the display processing module 304 switches to a display form causing an image to be displayed in the portrait display mode and by using the combined display. When determining that the control angle is within a range of 60 to 90 degrees and the value of the flag is "0", the display processing module 304 switches to a display form causing an image to be displayed in the landscape display mode and by using the combined display.

(3) In the above embodiment, the tilt detecting module 301 is an acceleration sensor, but the present invention is not limited in this way.

The tilt detecting module 301 may be a gyro sensor (an angular velocity sensor).

When the tilt detecting module 301 is a gyro sensor, the tilt detecting module 301 detects an angular velocity of the portable terminal and specifies a directional vector as the direction of the two-dimensional vector. The directional vector is specified by the angular velocity and indicates a direction of one of a long side or a short side of the second display. The tilt detecting module also detects an angle θ, defined by an x component and a y component indicated by a directional vector that is also indicated by the angular velocity.

Further, the tilt detecting module 301 is not limited to an acceleration sensor or a gyro sensor, and may be any mechanism that can detect a tilt of one side of the primary surface of the second display.

(4) In the above embodiment, an image may be displayed with the same aspect ratio when the same image is displayed in the portrait display mode and the landscape display mode.

Further, displaying of an image may be performed by enlarging or shrinking the image according to an aspect ratio of the display on which the image is to be displayed (i.e., the combined display or only the second display).

(5) The correction performed in the first form may be carried out by an application program (AP) that carries out display processing of images, etc., or by middleware that mediates between an operating system (OS) and an AP.

When middleware carries out the correction, an AP is notified of the result of the correction, and the AP determines how an image is to be displayed depending on the result that the AP receives.

(6) In the above embodiment, the tilt detecting module 301 detects a tilt of one short side of the second casing 120, or in other words a tilt of one short side of the second display 500, but the present invention is not limited in this way.

The tilt detecting module 301 may detect a tilt of one long side of the second casing 120, or in other words a tilt of one long side of the second display 500.

(7) In the above embodiment, explanation has been provided of an example where an image to be displayed is in the vector format. However, the present invention is not limited in this way.

An image to be displayed may be in a bitmap format. Assume that the image to be displayed is in a bitmap format and information output from an external factor that performed an instruction to display the image indicates that the image is to be displayed by the portable terminal 100 in the second form in a portrait display mode. In this situation, in order to switch to the landscape display mode, correction is performed based on the information received, so that the image is rotated by 90 degrees.

(8) In the above embodiment, the value used for the correction is 90 degrees, but the present invention is not limited in this way. The value used for the correction is not limited to 90 degrees, and may be any value.

(9) Each functional element in the above embodiment may realize a function thereof through cooperation with a processor included in the portable telephone 100.

(10) In the above embodiment, explanation has been made while taking a portable telephone as an example of the portable terminal of the present invention, but the present invention is not limited in this way. The portable terminal of the present invention is not limited to being a portable telephone, and may be any device that is portable, such as a personal digital assistant (PDA), personal handy-phone system (PHS), music player, electronic book, game device, and personal computer.

(11) A correction method pertaining to the present invention may be realized through the correction processing described in the embodiment (in particular, refer to the procedures involved in the correction processing illustrated in FIG. 7).

(12) A program that describes a procedure of the techniques explained in the above embodiment and modifications may be stored in a memory. A central processing unit (CPU) etc., may retrieve the program from the memory and execute the program, whereby the techniques described above may be realized.

Further, a program that describes such a procedure of the techniques may be stored on recording media and thereby distributed. Furthermore, media on which such a program may be stored include external memories such as flash memory, USB memory, and an SD Card™.

(13) The above embodiment and modifications may be combined with one another.

1.5 Supplement (1) One aspect of the present invention is a portable terminal including a casing that includes a first display and a casing that includes a second display, comprising: a first detecting module configured to detect a form of the portable terminal, the form being the first form formed by the first display and the second display arranged so that a short side of the first display and a short side of the second display combine to form a long side of a combined display, or the second form formed by overlaying the casing that has the second display upon the casing that has the first display, in the first form displaying being performed on the combined display and in the second form displaying being performed on only the second display; a second detecting module configured to detect a tilt of one side of the second display; a correction module configured to, when the first form is detected by the first detecting module, correct a result of the detection by the second detecting module; and a display processing module configured to, (i) when the first form is detected, display an image on the combined display using a first display form that is in accordance with a tilt indicated by a result of the correction by the correction module, in the first display form images being displayed according to an orientation of a long side and a short of the combined display, and (ii) when the second form is detected, display an image on the second display using a second display form that is in accordance with the tilt indicated by the result of the detection by the second detecting module, in the second display form images being displayed according to an orientation of a long side and a short side of the second display.

According to this configuration and with regard to a portable terminal that has two displays and is capable of using both displays in combination as one large display and of using only one display, the portable terminal can specify an orientation of the large display according to a detected orientation of one side of one of the two displays. This is due to the long and short sides of the combined display and the long and short sides of the second display being approximately 90 degrees out of alignment with each other. For example, if an orientation of the long side of the second display is corrected by 90 degrees, the orientation after correction will match the orientation of the long side of the combined display. Accordingly, by using the direction of the corrected two-dimensional vector, it is possible to perform displaying by using the combined display in the same way as displaying is performed by using only the second display, i.e. according to the orientation of a long and a short side of the second display.

(2) In the portable terminal pertaining to one aspect of the present invention, the second detecting module, as the tilt of one side of the second display, may detect a direction of a two-dimensional vector at a primary surface of the second display with respect to a directional vector. The correction module may rotate the two-dimensional vector and use a direction of the rotated two-dimensional vector as the result of the correction. The display processing module, when the first form is detected, may display an image using the first display form, which is in accordance with the direction of the rotated two-dimensional vector, and when the second form is detected, may display an image using the second display form, which is in accordance with the direction of the two-dimensional vector.

According to this configuration, the portable terminal can easily specify an orientation of a side of the primary surface of the second display by using the two-dimensional vector.

(3) In the portable terminal pertaining to one aspect of the present invention, the display processing module may rotate an image to be displayed by 90 degrees when an angle of the two-dimensional vector is within a predetermined range, and may display the rotated image by using the combined display when the first detecting module detects that the portable terminal is in the first form, and may display the rotated image by using the second display when the first detecting module detects that the portable terminal is in the second form.

According to this configuration, the portable terminal displays an image to be displayed by rotating the image according to the angle derived from the two-dimensional vector. Thus, the portable terminal can display an image in a form that is easy to view for a user, regardless of an orientation of the second display or the combined display.

(4) In the portable terminal pertaining to one aspect of the present invention, the predetermined range may be a range of at least 60 degrees and at most 90 degrees.

According to this configuration, the portable terminal may, for example, rotate an image to be displayed by 90 degrees when the angle derived from the two-dimensional vector is within a range of 60 to 90 degrees. This means that when the angle derived from the two-dimensional vector is within the range, the portable terminal can determine that the vertical/horizontal relationship of the long/short sides of the display has been inverted, and can therefore display the image in a form that is easy to view for a user.

(5) In the portable terminal pertaining to one aspect of the present invention, as illustrated by FIGS. 9A, 9B, 10A and 10B, the display processing module may maintain an aspect ratio of an image when displaying the image by rotating the image.

According to this configuration, the portable terminal can display an image without changing an aspect ratio of the image and thereby prevent blurring of hues, loss of detail, etc., that can result when scaling the image.

(6) In the portable terminal pertaining to one aspect of the present invention, the second detecting module may be an acceleration sensor, the directional vector indicating a vertical direction from the portable terminal, and the two-dimensional vector being a vector obtained by projecting the directional vector onto the primary surface of the second display.

Or the second detecting module may be a gyro sensor, detecting an angular velocity of the portable terminal and specifying a directional vector as the direction of the two-dimensional vector, the directional vector being specified by the angular velocity and indicating a direction of one of a long side or a short side of the second display.

According to this configuration the portable terminal detects an orientation of the second display by using different types of sensors.

The present invention is usable in a portable terminal that is transformable between two forms, a form where images etc. are displayed on the first display and the second display lined up as a large display, and a form where images etc. are displayed on only the second display.

REFERENCE SIGNS LIST

100 portable telephone
110 first casing
120 second casing
121 speaker
122 microphone
130 arm
301 tilt detecting module
302 form detecting module
303 correction module
304 display processing module
400 first display
500 second display

The invention claimed is:
1. A portable terminal including a casing that includes a first display and a casing that includes a second display, comprising:
   a first detecting module configured to detect a form of the portable terminal, the form being a first form formed by the first display and the second display arranged so that a short side of the first display and a short side of the second display combine to form a long side of a combined display, or a second form formed by overlaying the casing that includes the second display upon the casing that includes the first display, in the first form displaying being performed on the combined display and in the second form displaying being performed on the second display;
   a second detecting module configured to detect a tilt of one side of the second display, wherein the second detecting module, as the tilt of one side of the second display, detects a direction of a two-dimensional vector at a primary surface of the second display with respect to a directional vector;
   a correction module configured to, when the first form is detected by the first detecting module, correct a result of the detection by the second detecting module;
   a display processing module configured to,
   when the first form is detected, display an image on the combined display using a first display form that is in accordance with a tilt indicated by a result of the correction by the correction module, in the first display form images being displayed according to an orientation of a long side and a short side of the combined display, and when the second form is detected, display an image on the second display using a second display form that is in accordance with the tilt indicated by the result of the detection by the second detecting module, in the second display form images being displayed according to an orientation of a long side and a short side of the second display;

wherein the correction module rotates the two-dimensional vector and uses a direction of the rotated two-dimensional vector as the result of the correction, and the display processing module, when the first form is detected, displays an image using the first display form, which is in accordance with the direction of the rotated two-dimensional vector, and when the second form is detected, displays an image using the second display form, which is in accordance with the direction of the two-dimensional vector.

2. The portable terminal of claim 1, wherein the display processing module rotates an image to be displayed by 90 degrees when an angle of the two-dimensional vector is within a predetermined range, and displays the rotated image by using the combined display when the first detecting module detects that the portable terminal is in the first form, and displays the rotated image by using the second display when the first detecting module detects that the portable terminal is in the second form.

3. The portable terminal of claim 2, wherein the predetermined range is a range of at least 60 degrees and at most 90 degrees.

4. The portable terminal of claim 3, wherein the display processing module maintains an aspect ratio of an image when rotating an image and displaying the rotated image.

5. The portable terminal of claim 1, wherein the second detecting module is an acceleration sensor, the directional vector indicates a vertical direction from the portable terminal, and the two-dimensional vector is a vector obtained by projecting the directional vector onto the primary surface of the second display.

6. The portable terminal of claim 1, wherein the second detecting module is a gyro sensor, and the second detecting module detects an angular velocity of the portable terminal and specifies a directional vector as the direction of the two-dimensional vector, the directional vector being specified by the angular velocity and indicating a direction of one of a long side or a short side of the second display.

7. A display method, which is used in a portable terminal including a casing that includes a first display and a casing that includes a second display, the portable terminal including a first detecting unit, a second detecting unit, a correction unit, and a display processing unit, the display method comprising:

a first detecting step, by the first detecting unit, of detecting a form of the portable terminal, the form being a first form formed by the first display and the second display arranged so that a short side of the first display and a short side of the second display combine to form a long side of a combined display, or a second form formed by overlaying the casing that includes the second display upon the casing that includes the first display, in the first form displaying being performed on the combined display and in the second form displaying being performed on the second display;

a second detecting step, by the second detecting unit, of detecting, as a tilt of one side of the second display, a direction of a two-dimensional vector at a primary surface of the second display with respect to a directional vector;

a correction step, by the correction unit, of correcting a result of the detection by the second detecting module, when the first form is detected by the first detecting module, the correction step comprising rotating the two-dimensional vector and using a direction of the rotated two-dimensional vector as a result of the correction; and a display processing step, by the display processing unit, of displaying, when the first form is detected, an image on the combined display using a first display form that is in accordance with the direction of the rotated two-dimensional vector as a result of the correction by the correction module, in the first display form images being displayed according to an orientation of a long side and a short side of the combined display, and displaying, when the second form is detected, an image on the second display using a second display form that is in accordance with the direction of the two-dimensional vector which is the result of the detection by the second detecting module, in the second display form images being displayed according to an orientation of a long side and a short side of the second display.

\* \* \* \* \*